United States Patent
McCaffrey

(10) Patent No.: US 9,646,266 B2
(45) Date of Patent: May 9, 2017

(54) FEATURE TYPE SPECTRUM TECHNIQUE

(71) Applicant: University of Massachusetts, Boston, MA (US)

(72) Inventor: Anthony McCaffrey, West Brookfield, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 15/142,099

(22) Filed: Apr. 29, 2016

(65) Prior Publication Data

US 2016/0247091 A1 Aug. 25, 2016

Related U.S. Application Data

(63) Continuation-in-part of application No. 14/059,578, filed on Oct. 22, 2013, now abandoned.

(60) Provisional application No. 61/716,681, filed on Oct. 22, 2012.

(51) Int. Cl.
*G06T 11/20* (2006.01)
*G06N 99/00* (2010.01)
*G06F 17/28* (2006.01)

(52) U.S. Cl.
CPC .......... *G06N 99/005* (2013.01); *G06F 17/28* (2013.01); *G06T 11/206* (2013.01)

(58) Field of Classification Search
None
See application file for complete search history.

(56) References Cited

U.S. PATENT DOCUMENTS

| | | |
|---|---|---|
| 8,602,793 B1 | 12/2013 | Sniedzins |
| 8,700,620 B1 | 4/2014 | Lieberman |
| 8,838,659 B2 | 9/2014 | Tunstall-Pedoe |
| 8,880,547 B1 | 11/2014 | Mills |
| 8,909,516 B2 | 12/2014 | Medero |
| 8,924,198 B2 | 12/2014 | Prompt |
| 8,943,094 B2 | 1/2015 | Brown |
| 2007/0282811 A1 | 12/2007 | Musgrove |
| 2008/0104071 A1 | 5/2008 | Pragada |
| 2008/0195570 A1 | 8/2008 | Alsafadi |
| 2009/0070322 A1 | 3/2009 | Salvetti |
| 2009/0100053 A1 | 4/2009 | Boschee |
| 2009/0119095 A1 | 5/2009 | Beggelman |
| 2010/0070517 A1 | 3/2010 | Ghosh |
| 2011/0022635 A1 | 1/2011 | Michael |
| 2011/0161070 A1 | 6/2011 | Chen |
| 2011/0173174 A1 | 7/2011 | Flitcroft |
| 2011/0295823 A1 | 12/2011 | Sathish |
| 2011/0301941 A1 | 12/2011 | DeVocht |
| 2012/0254143 A1 | 10/2012 | Varma |
| 2014/0059078 A1 | 2/2014 | Gulwani |

*Primary Examiner* — Barry Drennan
*Assistant Examiner* — Jason Pringle-Parker
(74) *Attorney, Agent, or Firm* — Blueshift IP, LLC; Robert Plotkin

(57) ABSTRACT

Sensors are used to generate sample set data representing objects in a sample set. A computer system analyzes the sample set data to determine the frequencies with which features in a feature set are observed in the objects in the sample set. An example of such output is a bar chart representing the frequency of observation of features in the feature set in a particular object. The feature output may be used to identify one or more obscure (i.e., low frequency) features in the particular object. Machine learning may be used to learn associations between sample set data and features in the feature set.

44 Claims, 6 Drawing Sheets

FEATURE TYPE SPECTRUM TECHNIQUE

STATEMENT REGARDING FEDERALLY SPONSORED RESEARCH OR DEVELOPMENT

This invention was made with government support under Grant Nos. IIP1261052 and IIP1127609 from the National Science Foundation. The government has certain rights in the invention.

BACKGROUND

"Design fixation" is the tendency to fixate on the features of known solutions when trying to create novel solutions (Jansson & Smith, 1991). For example, a subject who is shown an existing chair and then asked to design an improved chair is likely to fixate on features of the existing chair when attempting to design an improved chair. Such fixation can lead the subject to overlook features that would be useful to include in an improved chair, but which are lacking in the existing chair.

SUMMARY

Sensors are used to generate sample set data representing objects in a sample set. A computer system analyzes the sample set data to determine the frequencies with which features in a feature set are observed in the objects in the sample set. An example of such output is a bar chart representing the frequency of observation of features in the feature set in a particular object. The feature output may be used to identify one or more obscure (i.e., low frequency) features in the particular object. Machine learning may be used to learn associations between sample set data and features in the feature set, thereby improving the accuracy and efficiency of future uses of the computer system.

DETAILED DESCRIPTION

Figure 4:
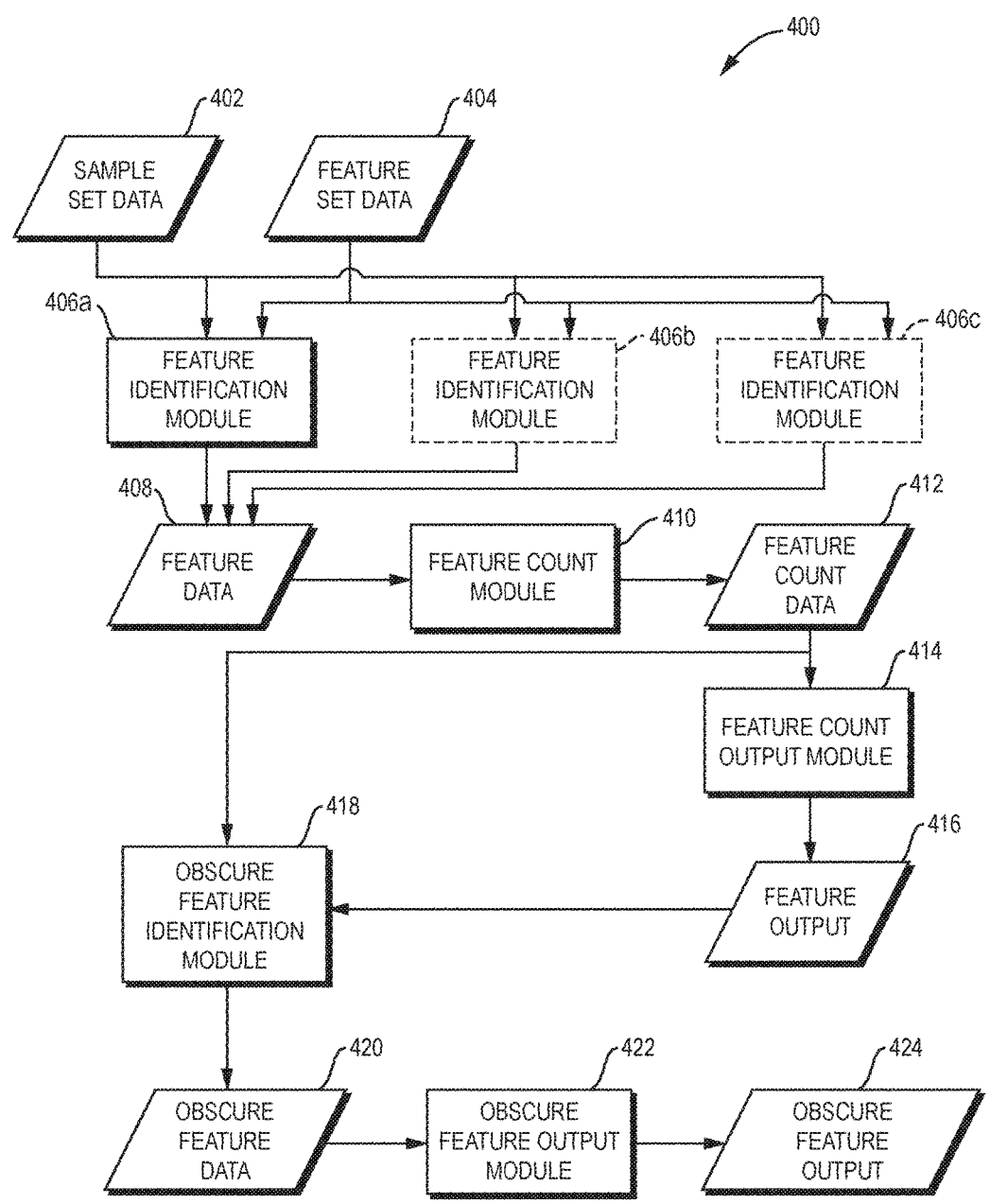
FIG. 4 is a dataflow diagram of a system for assisting in overcoming design fixation according to one embodiment of the present invention.
Figure 5:
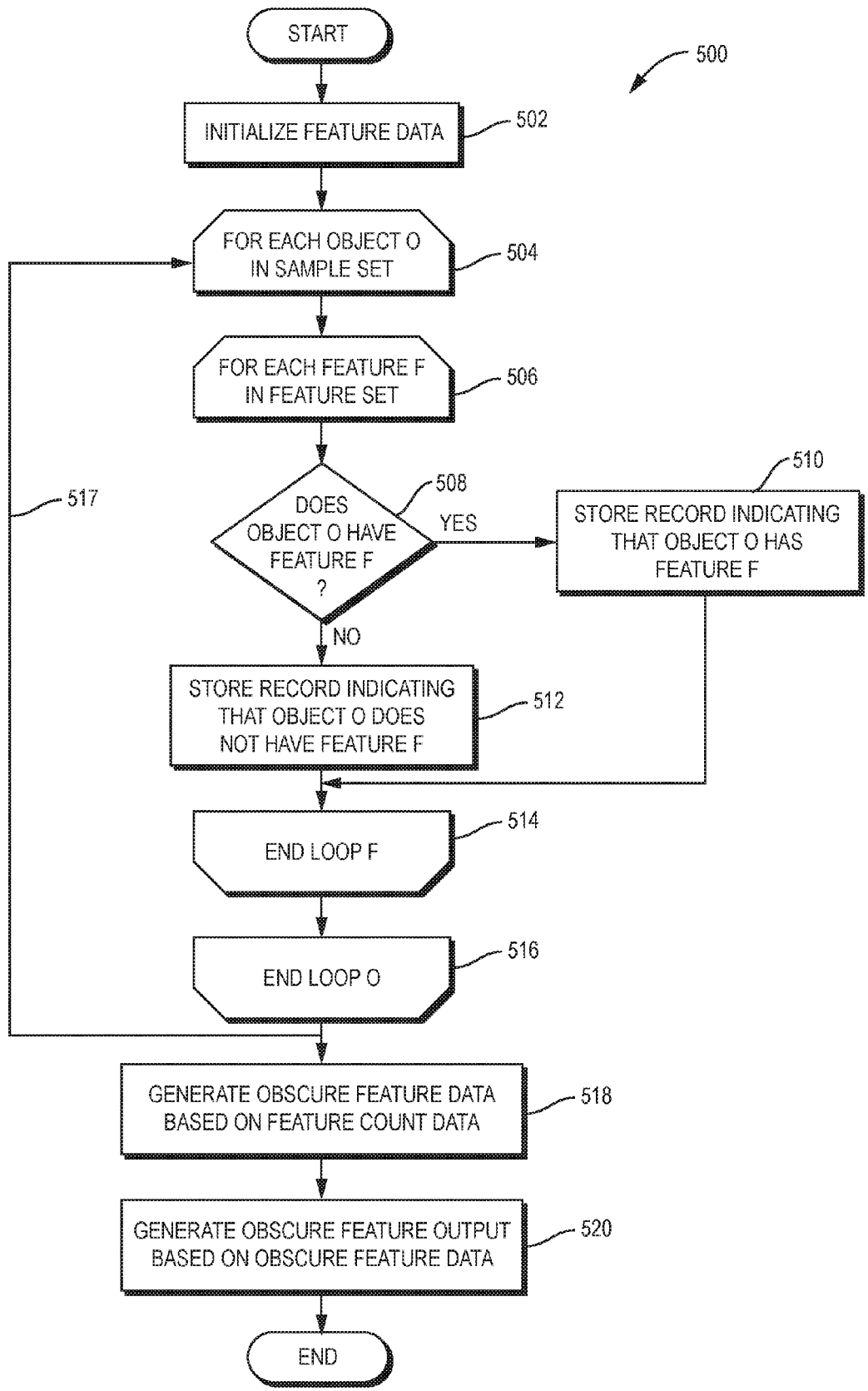
FIG. 5 is a flowchart of a method performed by the system of FIG. 4 according to one embodiment of the present invention.

Embodiments of the present invention may be used to alleviate design fixation in a variety of ways. Referring to FIG. 4, a dataflow diagram is shown of a system 400 that may be used to alleviate design fixation according to one embodiment of the present invention. Referring to FIG. 5, a flowchart is shown of a method 500 performed by the system 400 of FIG. 4 according to one embodiment of the present invention.

Consider a set of objects in a particular class of objects, such as a set of chairs in the class of chairs. Such a set of objects in a particular class of objects will be referred to herein as a "sample set." The system 400 of FIG. 4 includes sample set data 402 representing the sample set. The sample set data 402 may, for example, be computer-readable data representing the objects in the sample set. The sample set data 402 may be data stored in a non-transitory computer-readable medium. The sample set data 402 may, for example, be in the form of a database that includes one record for each of the objects in the sample set. Data representing an object in the sample set may take any form in the sample set data 402, such as a digital image of the object, a two-dimensional or three-dimensional model of the object, a textual description of the object, a parameterized model of the object (containing one or more parameters and corresponding parameter values), or any combination thereof. These are merely examples, however, and do not constitute limitations of the present invention. In general, the sample set data 402 may take any form consistent with the description herein.

The sample set may include any number of objects. For example, the sample set may consist of a single object. The sample set may, however, include two, three, or more objects, without any limit. As a result, the sample set data 402 may represent solely a single object, or two, three, or more objects, without any limit.

The objects in the sample set may have features that differ from each other. For example, one chair in the sample set may have four legs while another chair in the sample set may have three legs. As another example, one chair in the sample set may be constructed from plastic while another chair in the sample set may be constructed from wood.

Some objects in the sample set may have features that are lacking in other objects in the sample set. For example, one object in the sample set may be a rocking chair, which is capable of moving during its normal course of use, while another object in the sample set may be a conventional dining room chair, which is stationary during its normal course of use.

One function that may be performed by the system 400 of FIG. 4 and the method 500 of FIG. 5 is to identify features of the objects in the sample set. In particular, the system 400 may include a feature identification module 406a, which may identify features of the objects in the sample set based on the sample set data 402, thereby producing feature data representing the identified features of the sample set.

Embodiments of the present invention may use a feature set, also referred to herein as a "feature type taxonomy." The feature set may include any number of features, examples of which will be described below. The system 400 may include feature set data 404, which may represent the feature set. The feature set data 404 may, for example, be computer-readable data representing the features in the feature set. The feature set data 404 may be data stored in a non-transitory computer-readable medium. The feature set data 404 may, for example, be in the form of a database that includes one record for each of the features in the feature set. Data representing a feature in the feature set may take any form in the feature set data 404, such as a textual name of the feature, a definition of the feature, a human-readable description of the feature, or any combination thereof. These are merely examples, however, and do not constitute limitations of the present invention. In general, the feature set data 404 may take any form consistent with the description herein.

In the process described above, in which features of the objects in the sample set are identified, the system 400 may determine whether each object in the sample set has each of the features in the feature set. The system 400 may, for example, make such determinations based on the sample set data 402 and/or the feature set data 404. The result of such a determination for each feature-object pair may, for example, be a binary value (representing, e.g., "has" or "does not have") for that feature-object pair. This set of binary values (one for each feature-object pair) may be contained within the feature data 408 that is output by the feature identification module 406a.

The feature identification module 406a may include: (1) one or more computers; (2) one or more humans; or (3) any combination of (1) and (2). For example, the feature identification module 406a may include a computer that automatically generates and/or analyzes some or all of the sample set data 402 to produce some or all of the feature data 408 based on some or all of the feature set data 404. As another example, the feature identification module 406a may include a human who manually analyzes some or all of the sample set data 402 to produce some or all of the feature data 408 based on some or all of the feature set data 404.

The functions performed by the feature identification module 406a may be divided between computers and humans in any of a variety of ways. For example, a computer may produce feature data 408 for one object represented by the sample set data 402 automatically, while a human may produce feature data 408 for another object represented by the sample set data 402 manually. As another example, a computer may produce feature data for certain features of an object automatically, while a human may produce feature data for other features of the same object automatically, in which case the feature data 408 produced for that object will include some feature data produced by the computer and other feature data produced by the human.

If the feature identification module 406a includes a human, then the human may directly observe objects in the sample set using the human's senses, such as by looking at the object, touching the object, listening to the object, smelling the object, tasting the object, or any combination thereof. As this example illustrates, the sample set data 402 may include the objects in the sample set themselves, either in addition to or instead of data representing the objects in the sample set. Even if the feature identification module 406a includes a human, the human may produce some or all of the feature data 408 based on digital sample set data 402, such as digital images of the objects in the sample set, or on other indirect input containing information about the objects in the sample set, rather than based on direct sensory perception of those objects.

The system 400 may use the feature data 408 to produce feature output 416 representing the features of the sample set represented by the feature data 408. The feature output 416 may, for example, represent the frequency of occurrence of each feature in the feature data 408. For example, if one feature represented by the feature set data 404 is motion, then the feature output 416 may indicate the number of occurrences of the motion feature in the feature data 408. As will be described in more detail below, the feature output 416 may take any of a variety of forms, such as graphical output (e.g., a bar chart or other chart).

The feature data 408 may be used to generate the feature output 416 in any of a variety of ways. For example, the system 400 may include a feature count module 410. The feature count module 410 may generate, based on the feature data 408, for each feature in the feature set (represented by the feature set data 404), a count of the number of occurrences of the feature in the feature data 408. The count of the number of occurrences of a feature in the feature data 408 is referred to herein as the feature's "frequency count." The frequency count for a particular feature may be obtained, for example, by summing the binary values corresponding to the particular feature in the feature data 408. The feature count module 410 may produce feature count data 412, which may include frequency counts for some or all of the features in the feature set (represented by feature set data 404) and for some or all of the objects in the sample set (represented by the sample set data 402).

The system 400 may include a feature count output module 414, which may produce feature output 416 based on the feature count data 412 in any of a variety of ways. For example, the feature count output module 414 may produce feature output 416 in the form of a chart, such as a bar chart, a pie chart, or other chart representing the frequency counts in the feature count data 412. Because such a chart may resemble a spectrum of values, such a chart, or its underlying data, may be referred to herein as a "feature type spectrum." However, it should be appreciated that embodiments of the present invention are not limited to any particular representation of the feature count data 412 or to any particular visual depiction of the feature count data 412. Therefore, any reference herein to a "feature type spectrum" should be understood not to be limited to any particular examples disclosed herein, such as bar charts, but instead to encompass any kind of output representing the feature count data 412.

The techniques described above may be performed one or more times for each of some or all of the objects in the sample set. As one example, the system 400 may include one or more additional feature identification modules, such as feature identification modules 406b and 406c. Each of the feature identification modules 406a, 406b, and 406c may apply the techniques described above to the sample set data 402 and the feature set data 404. The frequency counts produced by the feature identification modules 406a-c may be aggregated (e.g., summed) with each other, so that the resulting feature data 408 represents the sums of the frequency counts produced by the feature identification modules 406a-c.

For example, consider the case in which the sample set consists of a single object, and in which the sample set data 402 therefore solely represents a single object. Now assume that the feature identification module 406a produces a frequency count of 1 for a particular feature of the sole object in the sample set, that feature identification module 406b produces a frequency count of 0 for the same feature of the sole object in the sample set, and that feature identification module 406c produces a frequency count of 1 for the same feature of the sole object in the sample set. In this case, the feature data 408 may include a value of two for the particular feature of the sole object in the sample set, as a result of summing 1, 1, and 0. The same technique may be applied to other features of the same object and to features of other objects (if the sample set contains other objects).

Although three feature identification modules 406a-c are shown in FIG. 4, this is merely an example and does not constitute a limitation of the present invention. The system 400 may include any number of feature identification modules, such as one, two, three or more feature identification modules. Each of the feature identification modules in the system 400 may be or include a computer, a human, or a combination thereof. For example, each of the three feature identification modules 406a-c may be a human. As another example, each of the three feature identification modules 406a-c may be a computer. As another example, one of the feature identification modules 406a-c may be a computer, while the other two of the feature identification modules 406a-c may be humans. These are merely examples and do not constitute limitations of the present invention.

The method 500 illustrated by FIG. 5 is an example of a method that may be used to implement the techniques disclosed above. The method 500 may, for example, be performed in whole or in part by one or more of the feature identification modules 406a-c. In particular, the method 500 begins by initializing the feature data 408 (FIG. 5, operation 502). The method 500 may, for example, initialize values corresponding to each of the features represented by the feature set data 404 to an initial value, such as zero.

The method 500 enters a loop over each object O in the sample set represented by the sample set data 402 (FIG. 5, operation 504). The method 500 enters a loop over each feature F in the feature set represented by the feature set data 404 (FIG. 5, operation 506).

The method 500 determines whether the object O has the feature F (FIG. 5, operation 508). The method 500 may make this determination in any of a variety of ways. In general, operation 508 may be performed by: (1) receiving the sample set data 402 and the feature set data 404 as input; (2) observing, analyzing, or otherwise processing some or all of the sample set data 402 and some or all of the feature set data 404 to determine whether the object O has the feature F. The determination may, for example, be made by one of the feature identification modules 406a-c. If the feature identification module that performs operation 508 is a computer, then the computer may make the determination using any of a variety of techniques. For example, if the sample set data 402 explicitly indicates, in a form that is automatically processable by the computer, that object O has feature F, then the computer may make the determination in operation 508 based directly on the sample set data 402. For example, the sample set data 402 may be pre-categorized by the creator of the sample set data 402. As a specific example, sample set data for a cup might indicate explicitly that the cup is made of ceramic and that ceramic is a type of material, where material is a type of feature. In this case, a computer may determine that the cup is made of ceramic based directly on the data in the sample set data, without any further processing.

If the feature identification module that performs operation 508 is a human, then the human may make the determination manually and provide input to the method using any suitable input device (such as a keyboard, mouse, microphone, touchscreen, or any combination thereof), wherein the input indicates whether the object O has the feature F. In this case, the system 400 and method 500 need not include the ability to determine whether object O has feature F automatically, but instead may rely on the judgment of the human, as represented by the input provided by the human to the system 400 and method 500. If the human input indicates that the object O has feature F, then the method 500 concludes in operation 508 that the object O has feature F. Conversely, if the human input indicates that the object O does not have feature F (or if the human input does not indicate that the object O has feature F), then the method 500 concludes in operation 508 that the object O does not have feature F.

The feature identification modules 406a-c may receive some or all of the sample set data 402 from one or more devices, such as from one or more sensors. Any such sensor may perform a sensing operation on an object and generate output, within the sample set data 402, representing a sensed property of the object. Any such output received from one or more sensors may be referred to herein as "sensor data." As used herein, the term "sensor" refers to a device, not to a human. Although a human may provide input to a sensor to cause the sensor to perform a sensing operation, the sensor nonetheless performs the sensing operation automatically, i.e., without human intervention. A sensor may be caused automatically to perform a sensing operation, i.e., not in response to input from a human. For example, a sensor may automatically perform sensing operations periodically, or in response to input from another device.

The feature identification modules 406a-c may receive sensor data automatically, i.e., without human intervention. For example, the feature identification modules may receive a particular sensor datum automatically from a particular sensor by "pulling" that sensor datum automatically from the sensor (e.g., by sending a request automatically to the particular sensor for the sensor datum, and then receiving the sensor datum automatically from the particular sensor in response to the request), or by the particular sensor "pushing" that sensor datum automatically to one or more of the feature identification modules 406a-c. Examples of such pushing include: (1) the sensor periodically (e.g., every second, minute, or hour) performing a sensing operation to generate sensor data and then automatically sending the sensor data to one or more of the feature identification modules 406a-c; and (2) the sensor detecting a change in the environment (e.g., the appearance of an object) and, in response to such detection, automatically performing a sensing operation to generate sensor data, and then automatically sending the sensor data to one or more of the feature identification modules 406a-c.

Embodiments of the present invention may use any of a variety of kinds of sensors to sense, and provide to the feature identification modules 406a-c, sample set data including sensor data. Examples of sensors which may be used to perform sensing operations to generate, and send to the feature identification modules 406a-c, sample set data including sensor data include any one or more of the following, in any combination:

- location sensors (such as Global Positioning System (GPS) sensors, Bluetooth Low Energy Beacons, or Wi-Fi Positioning System (WPS) sensors), in which case the sample set data 402 may include data representing one or more locations (e.g., one or more locations of the object O);
- motion sensors, in which case the sample set data 402 may include data representing one or more physical motions of the object O;
- acoustic sensors (such as a geophone, hydrophone, or microphone), in which case the sample set data 402 may include data representing one or more acoustic characteristics of the object O, such as data representing characteristics (e.g., pitch and/or amplitude) of sounds emitted by the object O;
- chemical sensors (such as breathalyzers, carbon dioxide sensors, and oxygen sensors), in which case the sample set data 402 may include data representing chemical characteristics (e.g., chemical composition and/or reaction rate) of one or more chemicals in, on, or emitted by the object O;

electric current, electric potential, magnetic, and radio sensors (such as current sensors, galvanometers, magnetometers, and voltage detectors), in which case the sample set data 402 may include data representing one or more electrical characteristics of the object O, such as one or more of electric current, electrical potential, resistance, magnetic fields, conductivity, or radio waves emitted by or otherwise sensed from the object O;

radioactivity sensors, in which case the sample set data 402 may include data representing one or more radioactivity characteristics of the object O, such as decay rate and/or intensity;

flow and fluid velocity sensors, such as air flow meters, anemometers, flow sensors, gas meters, mass flow sensors, and water meters, in which case the sample set data 402 may data representing one or more flow and/or fluid velocity characteristics of the object O, such as flow and/or fluid velocity sensed in connection with the object O;

position, angle, displacement, distance, speed/velocity, momentum, vibration, and acceleration sensors, such as capacitive displacement sensors, capacitive sensing sensors, free fall sensors, gyroscopic sensors, impact sensors, inclinometers, integrated circuit piezoelectric sensors, liquid capacitive inclinometers, odometers, photoelectric sensors, piezocapacitive sensors, piezoelectric accelerometers, position sensors, tilt sensors, tachometers, and velocity receivers, in which case the sample set data 402 may include data representing any combination of position, angle, displacement, distance, speed, and acceleration of the object O;

optical, light, imaging, and photon sensors, such as cameras, charge-coupled devices, CMOS sensors, colorimeters, contact image sensors, electro-optical sensors, infra-red sensors, kinetic inductance detectors, LED as light sensors, optical position sensors, photodetectors, photodiodes, phototransistors, photoelectric sensors, and photoresistors, in which case the sample set data 402 may include data representing one or more sensed optical inputs from the object O (which may, for example, be stored in the form of images and/or video);

pressure sensors, such as barographs, barometers, piezometers, pressure gauges, and tactile sensors, in which case the sample set data 402 may include data representing one or more pressure characteristics sensed from the object O;

force, density, level, tension, pressure, balance, friction, gravity, centrifugal force, centripetal force, and torque sensors, such as piezocapacitive pressure sensors, piezoelectric sensors, strain gauges, and torque sensors, in which case the sample set data 402 may include data representing any force, density, or level input sensed from the object O;

thermal, heat, and temperature sensors, such as calorimeters, infrared thermometers, resistance temperature detectors, resistance thermometers, temperature gauges, thermistors, thermocouples, thermometers, and pyrometers, in which case the sample set data 402 may include data representing any one or more thermal, heat, or temperature inputs sensed from the object O;

proximity and presence sensors, such as alarm sensors, Doppler radar sensors, motion detectors, proximity sensors, passive infrared sensors, touch switches, and wired gloves, in which case the sample set data 402 may include data representing any one or more proximity or presence inputs sensed from the object O; and durability sensors, in which case the sample set data 402 may include data representing any one or more durability characteristics of the object O, such as the strength and/or toughness of the object O.

Regardless of the manner in which the determination of operation 508 is made, if the object O is determined to have feature F, then the method 500 stores a record (e.g., in the feature data 408) indicating that object O has feature F (FIG. 5, operation 510); otherwise, the method 500 stores a record (e.g., in the feature data 408) indicating that object O does not have feature F (FIG. 5, operation 512).

Although operation 508 makes a binary determination of whether object O has feature F, resulting in a conclusion that object O either has or does not have feature F, this is merely an example and does not constitute a limitation of the present invention. More generally, any feature may have one or more parameters, each of which may have a set of permissible values. For example, assume that feature F has parameters $P_0$ and $P_1$, that parameter $P_0$ has a range of values $V_{P0}(0)$ and $V_0(1)$, and that parameter $P_1$ has a range of values $V_{P1}(0)$, $V_{P1}(1)$, and $V_{P1}(2)$. Considering two objects $O_0$ and $O_1$, both objects $O_0$ and $O_1$ may have feature F, and both objects $O_0$ and $O_1$ may have parameter $P_0$, but object $O_0$ may have a first value of parameter $P_0$ (such as value $V_{P0}(0)$), while object $O_1$ may have a second value of parameter $P_0$ (such as value $V_{P0}(1)$). Objects may have any number of parameters of a feature, and an object that has a particular parameter of a feature may have any value of that parameter.

For example, the feature of color may have a parameter of hue, which may have a range of values such as red, blue, and green. For example, if feature F is the feature of color, then one pen may have an ink color of blue, while another pen may have an ink color of green. Both pens have the feature of color and the parameter of hue, but each pen has a different value of that parameter. As another example, three plastic cups may all have the feature of size and the parameter of magnitude, but the first plastic cup may have a parameter value of small, the second plastic cup may have a parameter value of medium, and the third plastic cup may have a parameter value of large.

An object may be said to "have" a parameterized feature if the object has any value of any parameter of that feature. For example, an object may be said to have the feature of "color" if the object has any value of the "hue" parameter of color (e.g., red, blue, or green). An object may be said not to "have" a parameterized feature if the object does not have any value of any parameter of that feature (or if the object has a null value for the parameterized feature). For example, if the only parameter of the "color" feature is "hue," and a particular object does not have any "hue" value (or has a null "hue" value), then the particular object may be said to lack the feature of "color."

Parameters and parameter values may be treated as features for any of the purposes described herein. For example, if the feature of "color" has parameters of "hue" and "intensity," then the "hue" and "intensity" parameters may themselves be treated as features for any of the purposes described herein. For example, feature data 408, feature count data 412, feature output 416, and obscure feature data 420 may be generated for parameters and parameter values. As a particular example, an object with a "hue" parameter value of "green" may be said to have the "hue" feature and the "green" feature (i.e., the feature of "green-ness").

Operation 508 may include correlating or mapping data, such as input provided by humans in the feature identification modules 406a-c, to features, parameters, and parameter values. For example, one human observer may provide input describing a feature of a stapler as "staples paper," while another human observer may provide input describing a feature of the same stapler as "fastens paper together." Operation 508 may include determining that both such statements refer to the same feature and that both statements indicate that the stapler has that feature.

Figure 6:
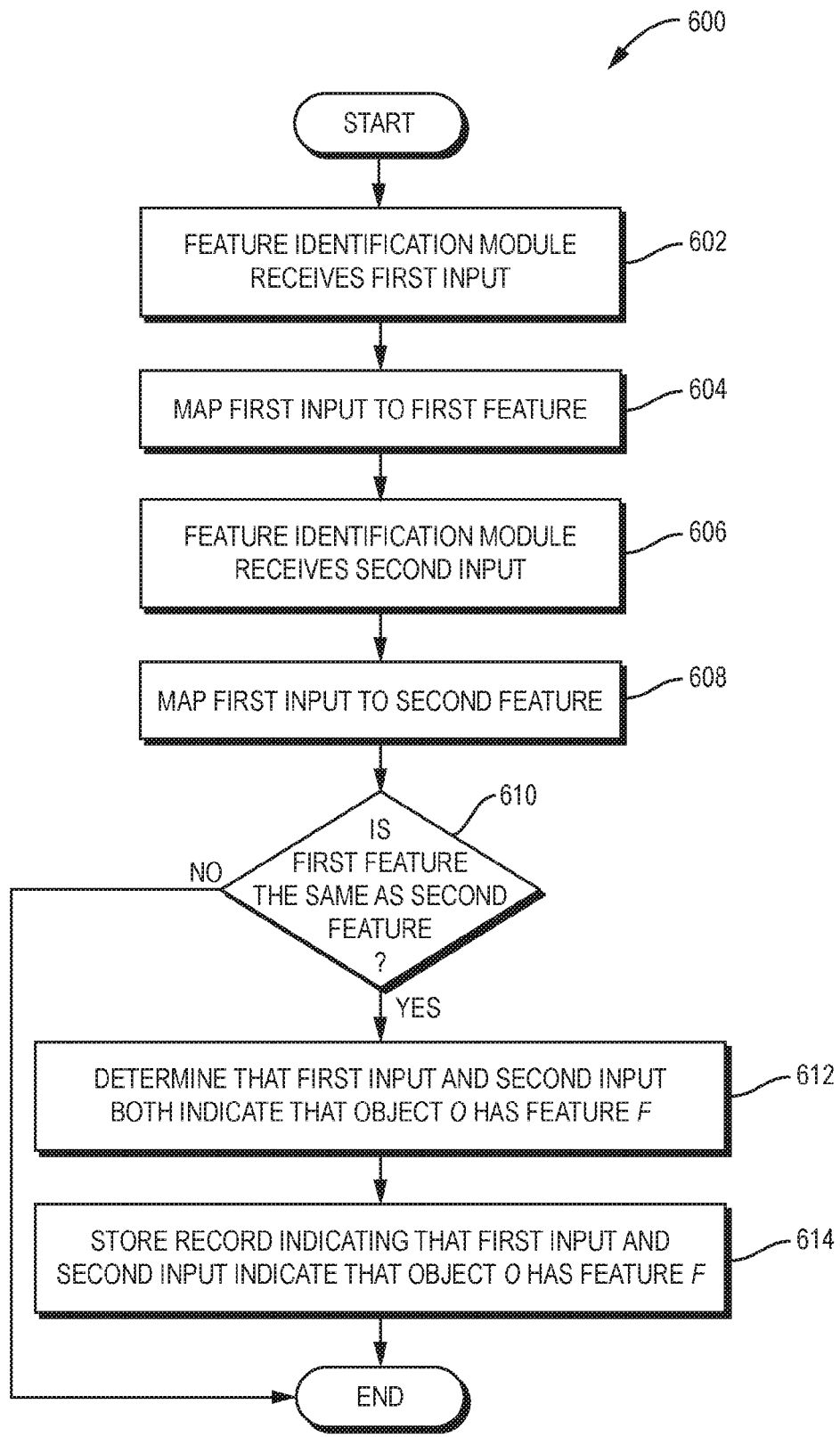
FIG. 6 is a flowchart of a method performed by the system of FIG. 4 to use machine learning to learn associations between sample set data and features according to one embodiment of the present invention.
Figure 7:
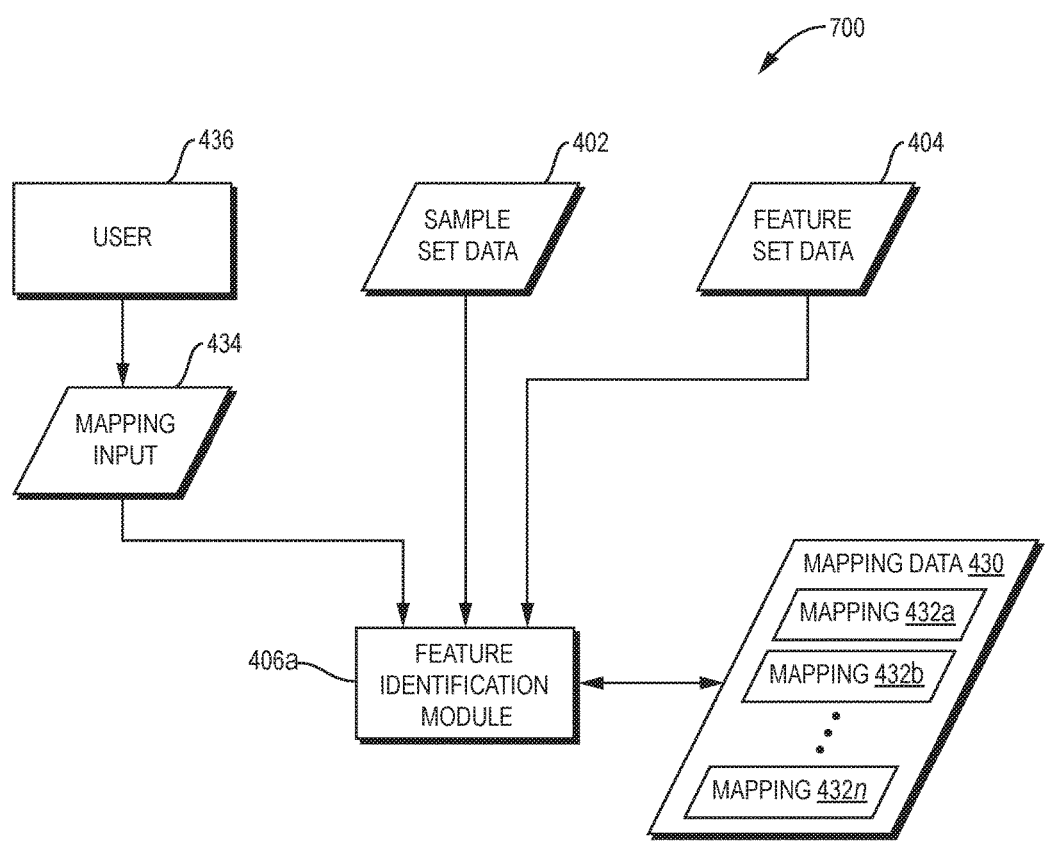
FIG. 7 is a dataflow diagram of a system for implementing the method of FIG. 6 according to one embodiment of the present invention.

Examples of techniques for determining that both such statements refer to the same feature are illustrated by the method 600 of FIG. 6 and the system 700 of FIG. 7. Although the system 700 of FIG. 7 may include all of the elements of FIG. 4, only certain elements of FIG. 4 are shown in FIG. 7 for ease of illustration. For example, although FIG. 7 only shows feature identification module 406a, the system 700 of FIG. 7 may include additional feature identification modules 406b-c. When one of the feature identification modules 406a-c receives first input (such as first input received from a human user) (FIG. 6, operation 602), the feature identification module 406a may map that first input to at least one first feature, parameter, and/or parameter value (FIG. 6, operation 604). When the feature identification module 406a receives second input (such as second input received from a human user) (FIG. 6, operation 606), the feature identification module 406a may map that second input to at least one second feature, parameter, and/or parameter value (FIG. 6, operation 608). Operations 602, 604, 606, and 608 may be performed automatically by computer-implemented feature identification modules.

The first input and the second input may take any form. For example, both the first input and the second input may be or include textual input, e.g., text strings (such as "reduces vibrations" and "minimizes rattling").

As just described, the first input may be mapped to a first corresponding feature, parameter, or parameter value, and the second input may be mapped to a corresponding second feature, parameter, or parameter value. Solely for ease of explanation, the following description will refer solely to a feature, rather than a feature, parameter, or parameter value. However, it should be understood that any technique disclosed herein in connection with a feature is equally applicable to a parameter or parameter value.

The feature identification module 406a may determine whether the first feature is the same feature as the second feature (FIG. 6, operation 610). For example, the feature identification module 406a may determine whether the first feature and the second feature are both the same feature in the feature set data 404. In response to determining that the first feature and the second feature are the same feature, the feature identification module 406a may determine that the first input and the second input both indicate that the object O has the feature F (which is both the first feature and the second feature) (FIG. 6, operation 612). As a particular example:

if the first input is the text string "color";
if the second input is the text string "pigmentation";
if the feature identification module maps the first input to the feature of "color";
if the feature identification module maps the second input to the feature of "color";
then the feature identification module 406a may determine that the first feature is the same feature as the second feature; and
the feature identification module 406a may determine that the first input and the second input both indicate that the object O has the feature of "color."

The feature identification module 406a may use any technique to determine whether the first input and the second input indicate the same feature as each other. As one example, the feature identification module 406a may be computer-implemented and may use any combination of one or more digital thesauri, technical dictionaries, slang dictionaries, and urban dictionaries to determine that the first input and the second input indicate the same feature as each other. For example, the feature identification module 406a may look up the first input and the second input in a digital thesaurus and determine, based on the contents of the digital thesaurus, whether both the first input and the second input have the same meaning (e.g., both are synonyms for the same term). If the contents of the digital thesaurus indicate that the first input and the second input have the same meaning, then the feature identification module 406a may conclude that the first input and the second input indicate the same feature as each other.

As another example, the feature identification module 406a, which may be computer-implemented, may determine whether the first input and the second input indicate the same feature as each other based on mapping input 434 received from a user 436. The mapping input 434 may indicate that the first input and the second input both indicate the same feature as each other. The mapping input 434 may, for example, contain data representing a particular feature that is indicated by both the first input and the second input. Additionally, the mapping input 434 may, for example, contain data representing or otherwise referring to the first input and/or the second input. As a particular example, the mapping input 434 may be input from the user 436 indicating that both the text (first input) "reduces vibrations" and the text (second input) "minimizes rattling" refer to the same feature of "motion."

The system 700 may store a mapping data structure 430 which contains a plurality of mappings 432a-n of inputs to features, where n may be any number. As indicated above, the mappings 432a-n, alternatively or additionally, map inputs to parameters and/or parameter values. For example, each of the mappings 432a-n may represent a mapping between a particular input (e.g., text string) and a particular feature. As a particular example, one of the mappings 432a-n may map the text string "fabric" to the feature of "material."

The feature identification module 406a may map an input (such as the first input or the second input) to a feature by searching for the input in the mappings 432a-n (e.g., using the input as an index into the mappings 432a-n) and, if a particular mapping containing the input is found in the mappings 432a-n, then the feature identification module 406a may identify the feature to which that input is mapped by the particular mapping. In this way the feature identification module 406a may map the input to a corresponding feature.

In response to determining that the first input and the second input both indicate the same feature as each other (regardless of whether that determination is performed automatically, in response to manual user input, or a combination thereof), the feature identification module 406a may store a record of this common mapping of the first input and the second input to the same common feature for future use (FIG. 6, operation 614). For example, in response to determining that the first input and the second input both indicate the same feature, the feature identification module 406a may store, in the mappings 432a-n:

a first mapping indicating that the first input maps to the common feature; and a second mapping indicating that the second input maps to the common feature.

Alternatively, for example, the feature identification module 406a may store, in the mappings 432a-n, a single mapping indicating that the first input and the second input map to the common feature.

The feature identification module 406a may then use such mappings 432a-n to determine that future first inputs and second inputs map to the same common feature, without needing to apply natural language processing or machine learning techniques to do so. For example, when the system 700 of FIG. 7 receives a subsequent first input and second input (which may be the same as or differ from the previous first input and second input described above), the system 700 may apply the techniques disclosed above to look up the subsequent first input and the subsequent second input in the existing mappings 432a-n (some of which may have been generated using the techniques described above in connection with FIGS. 6 and 7), and thereby determine, based on the existing mappings 632a-n, that the subsequent first input and the subsequent second input indicate the same feature as each other, without the need to receive subsequent human input indicating that the subsequent first input and the subsequent second input indicate the same feature as each other, and without otherwise needing to apply machine learning to draw this conclusion. This is one example of a way in which the method 600 of FIG. 6 and the system 700 of FIG. 7 may automatically learn from previous inputs and conclusions, and automatically apply such learning to subsequent inputs.

As described above, the method 600 of FIG. 6 and the system 700 of FIG. 7 may learn by updating the mappings 432a-n and then apply the mappings 432a-n to subsequent inputs. This is merely one example of a way in which embodiments of the present invention may learn automatically and store the knowledge resulting from such learning. As another example, in response to determining that the first input and the second input both indicate the same feature as each other (e.g., in response to the mapping input 434 received from the user 436 indicating that the first input and the second input both indicate the same feature), the system 700 may apply any of a variety of machine learning techniques to learn from this determination. In this way, operation 614 in FIG. 6 may more generally involve applying machine learning to learn from the first input, the second input, and the feature F. For example, the feature identification module 406a and/or other component of the system 700 may include a machine learning engine that receives the mapping input 434 and data representing the corresponding feature from the feature set data 404, and automatically applies machine learning techniques to the mapping input 434 and corresponding feature data to learn an association (e.g., mapping) between the mapping input 434 and corresponding feature data. More generally, such machine learning techniques may be used to learn: (1) a first association between the first input and the feature F; and (2) a second association between the second input and the feature F. The system 700 may store data representing both such associations, such as by storing first data representing the first association and storing distinct second data representing the second association, or by storing data representing a three-way association among the first input, the second input, and the feature F.

The system 700 may apply such learning to subsequent first and second inputs to determine automatically that such inputs indicate particular features.

Although embodiments of the present invention are not limited to use in connection with any particular machine learning technique(s), examples of machine learning techniques that may be used in the manner described above include decision tree learning, association rule learning, artificial neural networks, deep learning, inductive logic programming, support vector machines, clustering, Bayesian networks, reinforcement learning, representation learning, similarity and metric learning, sparse dictionary learning, and genetic algorithms. Although embodiments of the present invention are not limited to use in connection with any particular machine learning software, examples of machine learning software that may be used to implement machine learning techniques disclosed herein include dlib, ELKI, Encog, GNU Octave, H2O, Mahout, Mallet, mlpy, MLPACK, MOA, ND4J, NuPIC, OpenCV, OpenNN, Orange, R, scikit-learn, Shogun, TensorFlow, Torch, Spark, Yooreka, Weka, KNIME, RapidMinder, Angoss, Databricks, Google Prediction API, IBM SPSS Modeler, KXEN Modeler, LIONsolver, Mathematica, MATLAB, Microsoft Azure Machine Learning, Neural Designer, NeuroSolutions, Oracle Data Mining, RCASE, SAS Enterprise Miner, and STATISTICA Data Miner.

Returning to FIG. 5, the method 500 repeats the operations within the loop initiated in operation 504 (FIG. 5, operation 514), and repeats the operations within the loop initiated in operation 506 (FIG. 5, operation 516). Upon conclusion of operation 516, the feature data 408 includes frequency counts for all of the features of all of the objects in the sample set. It should be appreciated that, alternatively, the method 500 may produce frequency counts for fewer than all features in the feature set, for one or more objects in the sample set. Similarly, it should be appreciated that, alternatively, the method 500 may produce frequency counts for fewer than all objects in the sample set.

The method 500 may repeat one or more additional times (as illustrated by path 517 in FIG. 5). For example, the method 500 may be performed once by each of a plurality of feature identification modules in the system (e.g., feature identification modules 406a, 406b, and 406c). Note that the feature data 408 may be initialized only once (in operation 502), so that repeated performance of operations 504-516 causes frequency data produced by multiple feature identification modules to be combined (e.g., summed) with each other.

The system 400 also includes an obscure feature identification module 418, which may identify features of objects in the sample set having a particularly high frequency and/or features of objects in the sample set having a particularly low frequency, based on the feature count data 412 and/or the feature output 416, thereby generating obscure feature data 420, which indicates which features of the objects of the sample set have a particularly high frequency (i.e., features which satisfy a high frequency criterion) and/or which features of the objects in the sample set have a particularly low frequency (i.e., features which satisfy a low frequency criterion) (FIG. 5, operation 518).

The obscure feature identification module 418 may include: (1) one or more computers; (2) one or more humans; or (3) any combination of (1) and (2). For example, the obscure feature identification module 418 may include a computer that automatically analyzes some or all of the feature count data 412 to produce some or all of the obscure feature data 420 based on some or all of the feature count data 412. As another example, the obscure feature identification module 418 may include a human who manually analyzes some or all of the feature count data 412 to produce some or all of the obscure feature data 420 based on some or all of the feature count data 412.

Although not shown in FIG. 4, the system 400 may include multiple obscure feature identification modules, which may in combination produce the obscure feature data 420. Each of such multiple obscure feature identification modules may include: (1) one or more computers; (2) one or more humans; or (3) any combination of (1) and (2).

The obscure feature identification module 418 may produce the obscure feature data 420 in any of a variety of ways. For example, the obscure feature identification module 418 may determine, for each of one or more features in the feature set, whether the feature count data 412 indicates that the feature has a particularly low frequency (i.e., that the feature satisfies a low frequency criterion), such as by determining whether the frequency count for that feature is less than some predetermined maximum value (e.g., 3, 2, or 1). As a particular example, the obscure feature identification module 418 may determine whether the frequency count of the feature is equal to zero. As another example, the obscure feature identification module 418 may determine whether the frequency count of the feature is in the lowest X percentile of the frequency count data 412, where X may be any value, such as 1, 2, 5, 10, or 20. If the obscure feature identification module 418 determines that the frequency count for a feature is particularly low, then the obscure feature identification module 418 may store an indication, in the obscure feature data 420, that the feature has a particularly low frequency (i.e., is an obscure feature).

Additionally or alternatively, the obscure feature identification module 418 may determine, for each of one or more features in the feature set, whether the feature count data 412 indicates that the feature has a particularly high frequency (i.e., that the feature satisfies a high frequency criterion), such as by determining whether the frequency count for that feature is greater than some predetermined minimum value (e.g., 3, 2, or 1). As another example, the obscure feature identification module 418 may determine whether the frequency count of the feature is in the highest X percentile of the frequency count data 412, where X may be any value, such as 1, 2, 5, 10, or 20. If the obscure feature identification module 418 determines that the frequency count for a feature is particularly high, then the obscure feature identification module 418 may store an indication, in the obscure feature data 420, that the feature has a particularly high frequency, or that the feature does not have a particularly low frequency (i.e., is not an obscure feature).

As one particular example, if the obscure feature identification module 418 includes one or more humans, then the human(s) may make the determination in operation 518 of FIG. 5 by manually viewing the feature output (e.g., the bar chart of FIG. 1) and manually determining whether certain features have particularly low frequencies (e.g., frequencies of zero).

The system 400 may include an obscure feature output module 422, which may produce obscure feature output 424 based on the obscure feature data 420 (FIG. 5, operation 520). In general, the obscure feature output 424 represents the obscure feature data 420. The obscure feature output module 422 may produce the obscure feature output 424 in any of a variety of ways. For example, the obscure feature output module 422 may produce the obscure feature output 424 in the form of a chart, such as a bar chart, a pie chart, or other chart representing the frequency counts in the obscure feature data 420.

The obscure features identified by the obscure feature data 420 may then be used to develop new instances of objects represented by the objects in the sample set, by developing new instances of objects having the obscure features represented by the obscure feature data 420. Such development may, for example, be performed manually by humans after observing output representing the obscure feature data 420, and then developing new instances of objects having features that are identified as obscure features by the obscure feature data 420. Embodiments of the present invention may assist in this process by, for example, automatically producing the obscure feature output 424 in a form which emphasizes the features identified as obscure features by the obscure feature data 420. For example, the obscure feature output 424 may be generated by modifying the feature output 416 (e.g., the bar chart of FIG. 1) to perform one or both of the following: (1) emphasizing (e.g., change the color of) features identified as obscure features by the obscure feature data 420, and (2) de-emphasizing (e.g., changing the color of, or removing the display of) features not identified as obscure features by the obscure feature data 420. The obscure feature output 424 may, for example, include output representing the obscure feature data 420 and not include output representing features not represented by the obscure feature data 420, so that the obscure feature output 424 presents to the user only representations of obscure features in the sample set and no other (non-obscure) features in the sample set. The system 400 may provide such modified output to users of the system 400 to make it easier for such users to quickly and easily understand which features in the feature set are infrequently or never observed in the objects in the sample set.

As described above, the feature identification modules 406a-c may include any combination of humans and computers. More generally, various aspects of the system 400 may be implemented using computers, humans, or a combination thereof. For example:

The sample set data 402 may, for example, be stored as data in a non-transitory computer-readable medium and in a format that is readable by a computer. Additionally or alternatively, for example, the sample set data 402 may be analyzable by humans without the aid of a computer. For example, the sample set may be or include the objects in the sample set themselves, or data representing the sample set in a format that may be analyzed by humans without the use of a computer, such as printed photographs of the objects in the sample set.

The feature set data 404 may, for example, be stored as data in a non-transitory computer-readable medium and in a format that is readable by a computer. Additionally or alternatively, for example, the feature set data 404 may be analyzable by humans without the aid of a computer. For example, the feature set data 404 may be implemented as a list of descriptions of features in the feature set, written on paper.

The feature data 408 may, for example, be stored as data in a non-transitory computer-readable medium and in a format that is readable by a computer. Additionally or alternatively, for example, the feature data 408 may be created and analyzable by humans partially or entirely without the aid of a computer. For example, the feature data 408 may be a description, written on paper or typed into a word processing document by human observers, of the presence/absence of features from the feature set in the objects in the sample set.

The feature count data 412 may, for example, be stored as data in a non-transitory computer-readable medium and in a format that is readable by a computer. Additionally or alternatively, for example, the feature count data 412 may be created and analyzable by humans partially or entirely without the aid of a computer. For example, the feature count data 412 may be a description, written on paper or typed into a word processing document by human observers, of the count of the number of observations of each feature from the feature set in the objects in the sample set. As described above, the count of observations of a particular feature for a particular object may be the sum of the number of observations of that feature in that object across all of the feature identification modules (some or all of which may be humans).

The obscure feature data 420 may, for example, be stored as data in a non-transitory computer-readable medium and in a format that is readable by a computer. Additionally or alternatively, for example, the obscure feature data 420 may be created and analyzable by humans partially or entirely without the aid of a computer. For example, the obscure feature data 420 may be a description, written on paper or typed into a word processing document by human observers, of features of objects in the sample set having particular high and/or particularly low frequencies of observation.

The obscure feature output 424 may, for example, be stored as data in a non-transitory computer-readable medium and in a format that is readable by a computer. Additionally or alternatively, for example, the obscure feature output 424 may be created and analyzable by humans partially or entirely without the aid of a computer.

The variations listed in the list above may be combined with each other in any combination.

As the description above makes clear, embodiments of the present invention may be used to alleviate design fixation in a variety of ways. In particular, the feature output 416 may provide a panoramic view of the possible types of features, and their relative observed frequencies, in more of more objects in a class of objects. Such a panoramic view enables innovators to see the obscure feature types available for new designs as well as the feature types that previous solutions have been built upon.

Similarly, the obscure feature output 424 may emphasize obscure features in the sample set to the user, thereby enabling the user to quickly and easily identify obscure features in the sample set. For example, if the obscure feature output 424 takes the form of a chart which emphasizes obscure features in the sample set, the user may quickly identify obscure features with a quick glance at the chart, even if there is a large number of samples in the sample set and a large number of features in the feature set.

Embodiments of the present invention may use any feature set containing any number and type of features in any combination. However, a particular example of a feature set, also referred to herein as a feature type taxonomy, will now be described. Furthermore, experiments that were conducted to develop the particular feature set will be described.

A collection of 1,001 historic inventions (Challoner, 2009) was examined. It was noted that the key obscure features needed for a solution all fell into one of 32 types of features. This set of 32 features, which is listed below, is one example of a "feature set" or "feature type taxonomy" as those terms are used herein.

To measure how many of the feature types are usually overlooked, we had fifteen subjects write down as many features and associations as they could in four minutes for each of a set of fourteen common objects (e.g., candle and broom). We classified their answers among the 32 feature types of our taxonomy. On average, subjects listed only one response or no responses for 20.7 of the 32 categories (64.7%). Nearly two-thirds of the feature types for these common objects were either completely overlooked (no responses) or underexplored (only one response). If innovative solutions are built upon obscure features, then this result implies that many new designs for these common objects have yet to be created.

To test this hypothesis, we worked with the results from a candle, created as many new designs as we could in two one-hour sessions, obtained audiences with two candle companies, and asked them to assess the novelty of our designs.

Figure 1:
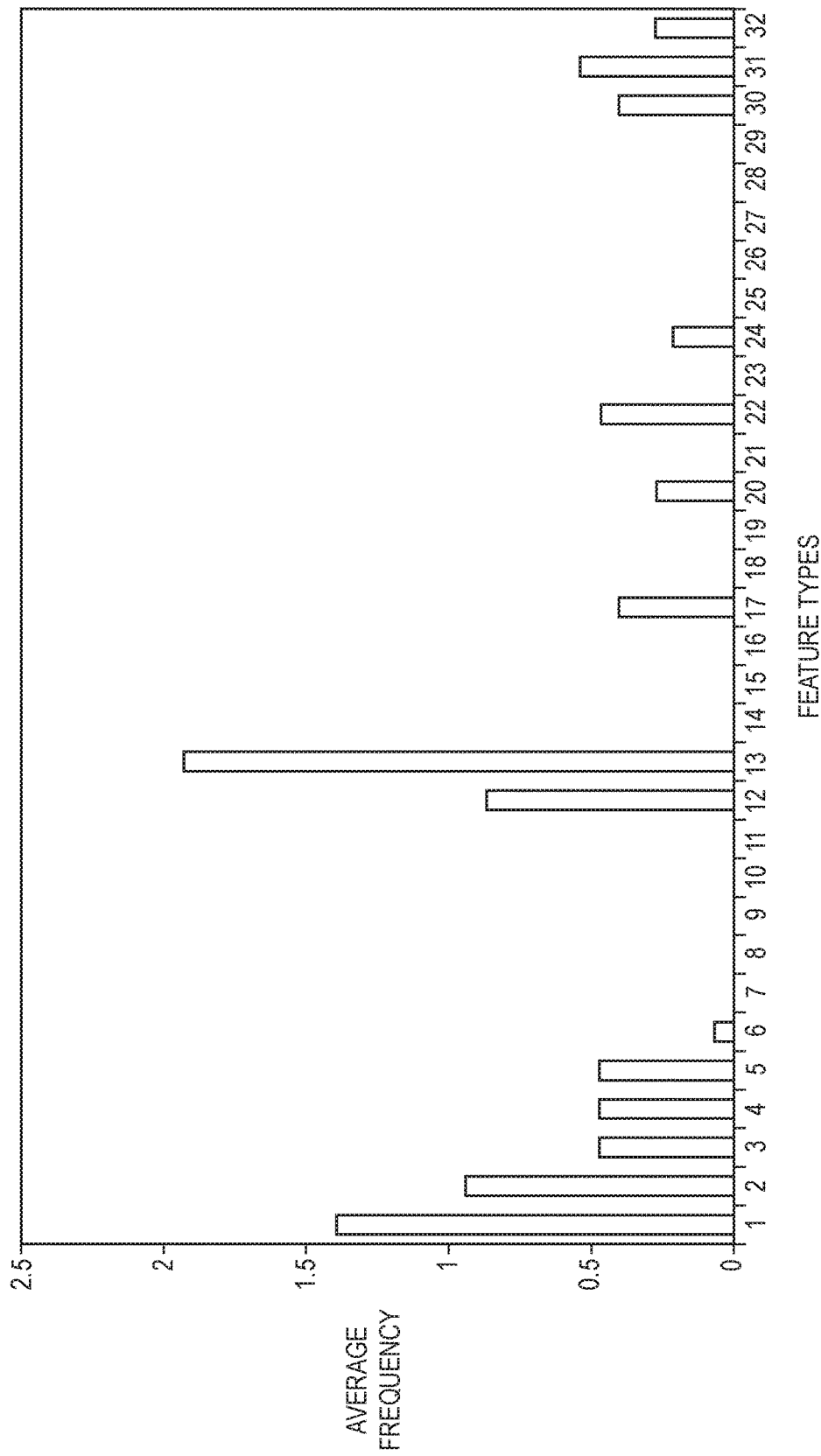
FIG. 1 is a bar chart representing an example of feature output according to one embodiment of the present invention.

FIG. 1 shows our results for a candle in the form of feature type spectrum (FTS), named as such because it gives a kind of spectral analysis to the features of a candle (McCaffrey and Spector, 2011). The y-axis of FIG. 11 represents the average number of times these subjects listed a feature of a particular type. The x-axis shows the 32 feature types presented by number. The feature type spectrum shown in FIG. 1 is an example of the feature output 416 in the system 400 of FIG. 4. The frequencies illustrated by FIG. 1 are examples of the feature count data 412 in the system 400 of FIG. 4.

FIG. 1 shows a clear pattern of underexplored and ignored feature types that could become the basis for innovation. The low bars (representing low frequencies, e.g., low values in the feature count data 412) and non-existent bars (representing values of zero in the feature count data 412) of FIG. 1 point to the obscure feature types upon which to build new candle designs. Using FIG. 1, we were able to create ten new candle designs in two one-hour sessions.

For example, we designed a self-snuffing candle based on two overlooked features. No one mentioned anything about the motion (type #28) of a candle (e.g., candles are motionless when they burn) or weight (type #9: candles lose weight when they burn). Using weight loss to try to generate vertical motion, we proceeded to interact our weight-losing candle with other objects/materials commonly associated with vertical motion. Searching for objects commonly associated with vertical motion reveals a list, which includes a justice scale, elevator, helicopter, kite, rocket, trampoline, and catapult. Using the first object in the list as an example, we placed a candle on one side of a scale-like structure and counterbalanced it with a weight on the other side. We also put a snuffer at the top so the candle eventually moves into the snuffer as it loses weight and extinguishes itself.

Candles have existed for approximately 5,000 years. As a result, most people would conclude that the space of candle designs has nearly been exhausted. However, our results point to the opposite conclusion. If novel candle designs are built upon obscure features and people overlook approximately 18 of the 32 types of features (56%) of a candle (FIG. 1), then the space of new candle designs is possibly quite richly populated. Using the FTS method in which all steps were carried out manually by humans (i.e., in which none of the steps of the process was automated by a computer, other than the generation of a bar chart based on data entered manually by humans), novice candle designers were able to create nine novel designs in the space of two hours. The feature type spectrum technique allows innovators to focus on the overlooked feature types of an object, thus relieving design fixation which keeps innovators fixated on the feature types used in current designs.

The particular example of a feature type taxonomy disclosed herein is intended to be a taxonomy that generally applies to all physical objects and materials, in that it only contains types of features that can apply to all physical objects and materials. The particular feature type taxonomy disclosed herein, however, is merely an example and does not constitute a limitation of the present invention. In practice, it may be used as a default or starting point, or it may be entirely replaced by other taxonomies. Furthermore, although the particular example of a feature type taxonomy disclosed herein contains 32 categories of features, feature type taxonomies used in conjunction with embodiments of the present invention may contain any number of categories of features.

Figure 2:
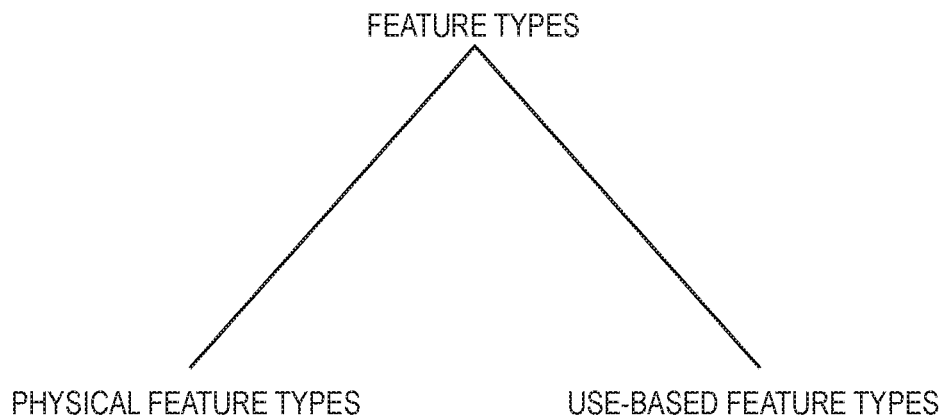
FIG. 2 is an illustration of a part of a feature set, also referred to herein as a feature type taxonomy, according to one embodiment of the present invention.

As shown in FIG. 2, the 32 feature types of the present example of a feature type taxonomy are segmented into two kinds: Physical Feature Types (14 feature types under this kind) and Use-Based Feature Types (18 features types under this kind). Before presenting all 32 feature types, the next section will first motivate the distinction between these two basic kinds.

We start with the distinction between features that are associated with a use and those that are not. Following Wittgenstein (1953), we will change the use of a common object and observe which types of features change their values and which types of features remain the same. The feature types that remain the same have a certain independence from the use of the object and will be considered physical features. The features that change as the object's use changes will be called use-based features.

Figure 3:
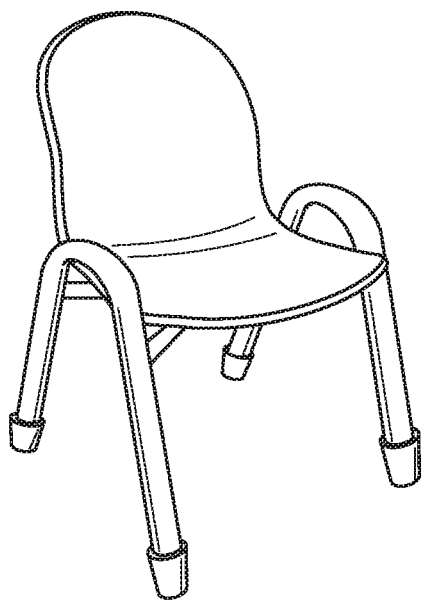
FIG. 3 is an illustration of a plastic chair.

Modernizing a thought experiment of Wittgenstein (1953), consider a PowerPoint presentation with several slides. On each slide is the same picture of a common plastic chair—and nothing else (FIG. 3).

A speaker shows the first slide and narrates, "Here is a picture of something to sit on." The second slide is shown. "Here is a picture of something to stand on to change a light bulb." The third slide is shown. "Here is a picture of a homeplate for a whiffle ball game." The fourth slide is shown. "Here is a picture of something to leverage under a doorknob to prevent someone from entering a room." The fifth slide is shown. "Here is something to row with." Turn the chair upside down, grab two legs, and start paddling water with the back of the chair pressing against the water. The sixth slide is shown. "Here is something that can provide shade for a short delicate plant that cannot tolerate direct sunlight." The seventh slide is shown. "Here is something for shovelling a pile of leaves." Grab a chair handle with one hand and a chair leg with another hand, and then start to shovel the leaves. There are many other slides, but we will stop here.

Because the same object is shown on each slide, obviously some features remain the same. What features of the chair remain the same as the use changes? All the physical parts remain the same as well as the material, shape, size, color, texture, and aroma of each of the parts. Further, the mass, weight, state of matter (i.e., solid), and number (e.g., there are four legs) of the overall object and each of the parts remains the same. Finally, the pattern of connectivity among the parts remains the same (e.g., the legs are connected to the seat) as well as the spatial relations among the parts (e.g., the back is basically perpendicular to the seat). We will call the features that remain the same physical features.

What features change as the use changes? We will call these use-based features.

Table 1, below, presents the 32 types of features that are included in one example of a feature type taxonomy according to embodiments of the present invention. The first 14 feature types are considered the physical features that have a certain independence from the object's use. The remaining 18 feature types are considered the use-based features that take on their values while the object is in use and change when the object is used in a different manner.

The first column presents the name of the feature type. The second column gives a description of the feature type. The third column presents an example based on the common use of the plastic chair in FIG. 3.

TABLE 1

Example Feature Type Taxonomy

| Name | Description | Example (based on plastic chair in FIG. 3) |
|---|---|---|
| Parts (First of the Physical Features) | Identifiable components of focal entity | Legs |
| Material | Material make-up of focal entity or its parts | Legs are metal |
| Shape | Overall shape of focal entity or its parts | Legs are U-shaped cylinders |
| Symmetry | An important but often overlooked characteristic of the shape of a focal entity | Legs are symmetrical in two dimensions |
| Size | Length, width, depth of focal entity or its parts | Legs are about 4 feet long and have a diameter of 2 inches |
| Color | . . . of focal entity or its parts | Legs are yellow |
| Texture | . . . of focal entity or its parts | Legs are smooth |
| Aroma | . . . of focal entity or its parts | No aroma for legs |
| Number | Number of components of a certain kind of the focal entity of its parts | 2 legs (because of the U-shape) |
| Mass | . . . of focal entity or its parts | The mass of the chair. |
| Weight | . . . of focal entity or its parts | A U-shaped leg weighs about 1 pound |
| State of Matter | (Solid, liquid, gas, plasma) of focal entity or its parts | Legs are solid |
| Connectivity among Parts | Physical connection among components of the focal entity. This feature is based on the chair when it is not being used. An inert chair possesses this feature of its parts being connected in some way. | The legs are connected to the seat |
| Spatial Relations among Parts | Distance and direction of one component to another of the focal entity. Again, this feature is based on the chair when it is not being used. An inert chair possesses this feature of | The bottoms of all four legs form a plane. |

TABLE 1-continued

Example Feature Type Taxonomy

| Name | Description | Example (based on plastic chair in FIG. 3) |
|---|---|---|
| | their being spatial relations among the parts. | |
| External Relations (First of the Use-Based Features) | Relations of focal entity to environmental entities during a particular use of the focal entity. | The seat of the chair relates to the seat of a person when the chair is being sat upon by the person |
| Environmental Partners | Environmental entities that the focal entity is used with during a particular use | A chair is often used with a table or a desk. |
| Motor Relations | How a human physically manipulates the focal entity or its parts during a particular use | To sit in a chair requires a complex motor movement that involves bending the knees so that the seat of the person lands on the seat of the chair. |
| Causal Relations | During a particular use, the cause-effect sequence set off among the parts of the focal entity as well as between the focal entity and its environmental entities | When a person sits on a chair, the weight is fairly evenly distributed across the chair's seat. The weight stresses the connecting points between chair seat and the legs. (etc.) |
| Place | The typical physical locations that the focal entity resides in during a particular use | Chairs often appear in kitchens, dining rooms, offices, on decks, etc. |
| Occasion | The typical contexts that a focal entity resides in during a particular use | Chairs are present during a family meal or a cookout on one's deck. |
| Energy/Forces | During a particular use, the types of energy and forces in play both within the focal entity as well as within and among the environmental entities | Because the chair is plastic, static electricity often builds up between the chair surface and the clothes of the person using the chair. |
| Perspective | The typical physical viewing point that a human takes with respect to the focal entity during a particular use. | A person of views the chair from a vantage point of several feet above the chair and several to many feet away from the chair. The typical perspective shapes what parts of the chair people tend to notice and which parts they overlook. |
| Time | The typical time-frame (milliseconds, hours) that a focal entity occupies during a particular use | An occasion of sitting commonly lasts between several minutes to a couple of hours. |
| Motion | The typical type of motion engaged in by a focal entity during a particular use | A chair is generally motionless when it is being sat upon. |
| Permanence/Transience | How long the focal entity tends to last as it is used | A chair is usually designed to last for many years. |
| Superordinate | The more general classification of the focal entity based on its typical use | Based on its designed use, the superordinate of a chair is furniture. |
| Subordinate | More specific versions of the focal entity based on its typical use | Based on its designed use, a subordinate of a chair is a rocking chair or a bench. |
| Synonym (based on use) | Other entities that can achieve the same use as the focal entity | Other objects (not subordinates) that can be sat on in a pinch. Examples: a large flat rock, a kitchen counter, a coffee table. |
| Space | The spatial relations between the focal entity and the environmental entities during a particular use | Any spatial relation between a chair and other objects during its designed use. Example: a chair is pulled under a table so that the back of the chair is about 1.5 feet from the edge of the table |
| Orientation | The spatial orientation required for the focal entity to achieve its use (a very important sub-case of overall spatial relations) | In order to be sat upon, the chair is upright; that is, the seat of the chair is above the legs. |
| Side Effects | Other effects besides the desired ones that are produced while the focal entity is in use | A side effect of sitting in a chair is the pressure of the legs on the floor. If used in the same place on the floor, over time this pressure can create indentations on the floor. |
| Sound | The sound emitted by the focal entity during a particular use | A chair may creak when a heavy person sits on the chair. |

Although the feature type taxonomy shown in FIG. 2 is divided into two levels (types), this is merely an example and does not constitute a limitation of the present invention. More generally, feature type taxonomies used in conjunction with embodiments of the present invention may take any form. For example, a feature type taxonomy may have a hierarchical (e.g., tree-shaped) form with any number of levels, branches, and nodes in any configuration.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

The description herein refers to objects "having" features. In practice, embodiments of the present invention may determine whether a particular object has a particular feature based on the feature data 408 that is output by the feature identification modules 406a-c. In practice, the feature data 408 may include records of observations, memories, judgments, and other determinations (by computers and/or humans) of whether particular objects have particular features. Embodiments of the present invention may use such records of determinations as proxies for the actual features of the actual objects themselves. Therefore, any reference herein to an object "having" a feature, parameter, or parameter value should be understood to refer to an indication (e.g., by the feature data 408) that the object has the feature, parameter, or parameter value (such as an indication resulting from a perception or conclusion by one or more of the feature identification modules 406a-c that the object has the feature, parameter, or parameter value), whether or not the object actually has the feature, parameter, or parameter value.

Therefore, references herein to the "frequency" or "frequency of occurrence" of a feature, parameter, or parameter value with respect to a particular object should be understood to refer to the frequency with which the feature, parameter, or parameter value is indicated by the feature data 408 with respect to the particular object (e.g., the number of times the feature identification modules 406a-c determine that the object has the feature, parameter, or parameter value). Certain observations of a particular object may result in a determination that the object has a particular feature, parameter, or parameter value, while other observations of the same object may not result in a determination that the object has the particular feature, parameter, or parameter value. For example, a ceramic cup may be observed by three different people, two of whom may conclude that the cup has the material parameter value of "ceramic," and one of whom may not conclude that the cup has the material parameter value of "ceramic."

Similarly, features described herein as "use-based features" are statements about how an object may be used (e.g., the place of use or the occasion of use). For example, a ceramic cup often appears in restaurants, diners, and kitchens. These are examples of the ceramic cup's place of use. Examples of occasions of use for a ceramic cup may include: drinking a hot liquid with a meal and drinking coffee with breakfast. In these examples, the object (i.e., ceramic cup) does not inherently "have" the stated feature. Instead, the stated feature (e.g., the ceramic cup's place of use or occasion of use) describes circumstances commonly associated with the use of the object. Therefore, references herein to an object "having" a particular use-based feature, parameter, or parameter value refers to the fact that the object was observed or otherwise determined to have the particular use-based feature during the object's normal course of use.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Each computer program within the scope of the claims below may be implemented in any programming language, such as assembly language, machine language, a high-level procedural programming language, or an object-oriented programming language. The programming language may, for example, be a compiled or interpreted programming language.

Embodiments of the present invention include features which are only possible and/or feasible to implement with the use of one or more computers, computer processors, and/or other elements of a computer system. Such features are either impossible or impractical to implement mentally and/or manually. For example, as described in connection with FIGS. 6 and 7, embodiments of the present invention may automatically learn and store associations between inputs and features using computer-automated machine learning techniques. Such techniques are in fact performed by a computer, and are only capable of being performed by computers. As a result, such techniques are inherently computer-related. Furthermore, one result of applying such automated machine learning techniques is to enable embodiments of the present invention to apply such learning to future inputs to determine automatically that such inputs are associated with particular features. Such automated application of the results of machine learning is in fact performed by a computer, and can only be performed by a computer. As a result, such automated application of the results of machine learning is inherently computer-related.

Furthermore, embodiments of the present invention provide inherently technical solutions to inherently technical problems. For example, embodiments of the present invention provide inherently technical solutions to the inherently technical problem of how to use a computer to automatically learn that two or more inputs (e.g., text strings) are associated with the same feature as each other. This problem is inherently technical because it relates to the use of a computer to draw a conclusion about the meaning of inputs, even though a computer cannot understand meaning. Instead, if a computer is to conclude that two or more inputs are associated with the same feature as each other, it must be by using technical mechanisms to achieve the result of concluding accurately that such inputs are associated with the same feature as each other, but without understanding the meanings of such inputs. Embodiments of the present invention solve this inherently technical problem by applying computer-automated techniques, such as computer-automated machine learning techniques, to determine that two or more inputs are associated with the same feature as each other.

As another example, embodiments of the present invention provide inherently technical solutions to the inherently technical problem of how to use sensors to perform sensing operations to generate data representing sensed properties of a physical object. This is an inherently technical problem because it relates to the use of machinery, namely sensors, to sense physical properties of physical objects automatically. Embodiments of the present invention solve this inherently technical problem by using sensors to perform sensing operations to generate data representing sensed properties of a physical object, and using a computer to map such data to features in a feature set automatically. One technical benefit of such solutions provided by embodiments of the present invention is that they enable the physical properties of a physical object to be identified more quickly and with less human effort (possibly no human effort) than by relying on human senses and input to identify the properties of the physical object.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

What is claimed is:

1. A method performed by at least one computer processor executing computer program instructions stored on a non-transitory computer-readable medium, the method comprising:
(A) generating, for each feature F in a plurality of features, a plurality of frequencies of observation of feature F in an object $O_1$, wherein the plurality of features includes at least one physical feature and at least one use-based feature, comprising:
(A) (1) receiving first textual input from a first human;
(A) (2) receiving second textual input from a second human, wherein the first textual input differs from the second textual input;
(A) (3) mapping the first textual input and the second textual input to the same feature $F_0$ in the plurality of features; and
(A) (4) determining that the first textual input and the second textual input indicate that the object $O_1$ has feature $F_0$;
(B) generating output representing the plurality of frequencies of observation of each feature F in object $O_1$;
(C) identifying, based on the plurality of frequencies of observation of each feature F in object $O_1$, a first subset of the plurality of features having frequencies satisfying a low frequency criterion, comprising:
(C) (1) generating, for each feature F in the plurality of features, a frequency count for feature F in object $O_1$ based on the plurality of frequencies of observation of feature F in object $O_1$; and
(C) (2) determining, for each feature F in the plurality of features, whether the frequency count for feature F satisfies the low frequency criterion, comprising:
determining that the feature count for a first one of the plurality of features satisfies the low frequency criterion; and
determining that the feature count for a second one of the plurality of features does not satisfy the low frequency criterion;
(D) automatically learning a first association between the first textual input and the feature $F_0$, and storing first association data representing the first association;
(E) automatically learning a second association between the second textual input and the feature $F_0$, and storing second association data representing the second association; and
wherein the frequency count for at least one feature F is equal to zero.

2. The method of claim 1, wherein (A) comprises:
(A) (1) generating, for each feature F in the plurality of features, a first indication of whether object $O_1$ was observed to have feature F, thereby generating a first plurality of indications for object $O_1$;
(A) (2) generating, for each feature F in the plurality of features, a second indication of whether object $O_1$ was observed to have feature F; thereby generating a second plurality of indications for object $O_1$; and
(A) (3) generating the plurality of frequencies of observation of feature F in object $O_1$ based on the first and second pluralities of indications for object $O_1$.

3. The method of claim 1, wherein the output representing the plurality of frequencies of observation of feature F in object $O_1$ comprises a chart representing the plurality of frequencies of observation of feature F in object $O_1$.

4. The method of claim 3, wherein the chart comprises a bar chart.

5. The method of claim 3, wherein the chart comprises a pie chart.

6. The method of claim 1, wherein the low frequency criterion comprises a maximum value, wherein (C) (2) comprises determining, for each feature F in the plurality of features, whether the frequency count for feature F is less than the maximum value, and wherein the first subset comprises features in the plurality of features having frequencies less than the maximum value.

7. The method of claim 1, further comprising:
(F) identifying, based on the plurality of frequencies of observation of feature F in object $O_1$, a second subset of the plurality of features having frequencies satisfying a high frequency criterion.

8. The method of claim 7, wherein the high frequency criterion comprises a minimum value, and wherein the second subset comprises features in the plurality of features having frequencies greater than the minimum value.

9. The method of claim 1, further comprising:
(F) generating output representing the first subset of the plurality of features having frequencies satisfying the low frequency criterion.

10. The method of claim 9, wherein the output representing the first subset of the plurality of features having frequencies satisfying the low frequency criterion includes output representing the frequencies satisfying the low frequency criterion.

11. The method of claim 9, wherein the output representing the first subset of the plurality of features having frequencies satisfying the low frequency criterion comprises a chart.

12. The method of claim 11, wherein the chart comprises a bar chart.

13. The method of claim 11, wherein the chart comprises a pie chart.

14. The method of claim 9, wherein the output representing the plurality of frequencies of observation of feature F in object $O_1$ includes the output representing the first subset of the plurality of features having frequencies satisfying the low frequency criterion.

15. The method of claim 14, wherein the output representing the first subset of the plurality of features having frequencies satisfying the low frequency criterion comprises output emphasizing the first subset of the plurality of features.

16. The method of claim 1, wherein the object O is a physical object.

17. The method of claim 1:
wherein (D) comprises using a machine learning engine to automatically learn the first association; and
wherein (E) comprises using the machine learning engine to automatically learn the second association.

18. The method of claim 1, further comprising:
(F) receiving third textual input from the first human;
(G) receiving fourth textual input from the first human; and
(H) determining, based on at least one of the first association and the second association, that the third textual input and the fourth textual input indicate that a second object $O_2$ has feature $F_0$.

19. The method of claim 1, wherein (H) comprises determining, based on the first association and the second association, that the third textual input and the fourth textual input indicate that a second object $O_2$ has feature $F_0$.

20. The method of claim 1, wherein the first association data and the second association data are the same data.

21. The method of claim 1, wherein (A) further comprises:
(A) (5) receiving, from a first sensor, first sensor data representing a sensed property of the object $O_1$; and
(A) (6) mapping the first sensor data to the feature $F_0$.

22. The non-transitory computer-readable medium of claim 1, wherein (A) further comprises:
(A) (5) receiving, from a first sensor, first sensor data representing a sensed property of the object $O_1$; and
(A) (6) mapping the first sensor data to the feature $F_0$.

23. The method of claim 21, wherein the first sensor comprises a first imaging sensor, and wherein the first sensor data represents an optical input from the object $O_1$.

24. A non-transitory computer-readable medium comprising computer program instructions executable by at least one computer processor to perform a method, the method comprising:
(A) generating, for each feature F in a plurality of features, a plurality of frequencies of observation of feature F in an object $O_1$, wherein the plurality of features includes at least one physical feature and at least one use-based feature, comprising:
(A) (1) receiving first textual input from a first human;
(A) (2) receiving second textual input from a second human, wherein the first textual input differs from the second textual input;
(A) (3) mapping the first textual input and the second textual input to the same feature $F_0$ in the plurality of features; and
(A) (4) determining that the first textual input and the second textual input indicate that the object $O_1$ has feature $F_0$;
(B) generating output representing the plurality of frequencies of observation of each feature F in object $O_1$;
(C) identifying, based on the plurality of frequencies of observation of each feature F in object $O_1$, a first subset of the plurality of features having frequencies satisfying a low frequency criterion, comprising:
(C) (1) generating, for each feature F in the plurality of features, a frequency count for feature F in object $O_1$ based on the plurality of frequencies of observation of feature F in object $O_1$; and
(C) (2) determining, for each feature F in the plurality of features, whether the frequency count for feature F satisfies the low frequency criterion, comprising:
determining that the feature count for a first one of the plurality of features satisfies the low frequency criterion; and
determining that the feature count for a second one of the plurality of features does not satisfy the low frequency criterion;
(D) automatically learning a first association between the first textual input and the feature $F_0$, and storing first association data representing the first association;
(E) automatically learning a second association between the second textual input and the feature $F_0$, and storing second association data representing the second association; and
wherein the frequency count for at least one feature F is equal to zero.

25. The non-transitory computer-readable medium of claim 24, wherein (A) comprises:
(A) (1) generating, for each feature F in the plurality of features, a first indication of whether object $O_1$ was observed to have feature F, thereby generating a first plurality of indications for object $O_1$;
(A) (2) generating, for each feature F in the plurality of features, a second indication of whether object $O_1$ was observed to have feature F; thereby generating a second plurality of indications for object $O_1$; and
(A) (3) generating the plurality of frequencies of observation of feature F in object $O_1$ based on the first and second pluralities of indications for object $O_1$.

26. The non-transitory computer-readable medium of claim 24, wherein the output representing the plurality of frequencies of observation of feature F in object $O_1$ comprises a chart representing the plurality of frequencies of observation of feature F in object $O_1$.

27. The non-transitory computer-readable medium of claim 26, wherein the chart comprises a bar chart.

28. The non-transitory computer-readable medium of claim 26, wherein the chart comprises a pie chart.

29. The non-transitory computer-readable medium of claim 24, wherein the low frequency criterion comprises a maximum value, wherein (C) (2) comprises determining, for each feature F in the plurality of features, whether the frequency count for feature F is less than the maximum value, and wherein the first subset comprises features in the plurality of features having frequencies less than the maximum value.

30. The non-transitory computer-readable medium of claim 24, wherein the method further comprises:
(F) identifying, based on the plurality of frequencies of observation of feature F in object $O_1$, a second subset of the plurality of features having frequencies satisfying a high frequency criterion.

31. The non-transitory computer-readable medium of claim 30, wherein the high frequency criterion comprises a minimum value, and wherein the second subset comprises features in the plurality of features having frequencies greater than the minimum value.

32. The non-transitory computer-readable medium of claim 24, wherein the method further comprises:
(F) generating output representing the first subset of the plurality of features having frequencies satisfying the low frequency criterion.

33. The non-transitory computer-readable medium of claim 32, wherein the output representing the first subset of the plurality of features having frequencies satisfying the low frequency criterion includes output representing the frequencies satisfying the low frequency criterion.

34. The non-transitory computer-readable medium of claim 32, wherein the output representing the first subset of the plurality of features having frequencies satisfying the low frequency criterion comprises a chart.

35. The non-transitory computer-readable medium of claim 34, wherein the chart comprises a bar chart.

36. The non-transitory computer-readable medium of claim 34, wherein the chart comprises a pie chart.

37. The non-transitory computer-readable medium of claim 32, wherein the output representing the plurality of frequencies of observation of feature F in object $0_1$ includes the output representing the first subset of the plurality of features having frequencies satisfying the low frequency criterion.

38. The non-transitory computer-readable medium of claim 37, wherein the output representing the first subset of the plurality of features having frequencies satisfying the low frequency criterion comprises output emphasizing the first subset of the plurality of features.

39. The non-transitory computer-readable medium of claim 24, wherein the object O is a physical object.

40. The non-transitory computer-readable medium of claim 24:
wherein (D) comprises using a machine learning engine to automatically learn the first association; and
wherein (E) comprises using the machine learning engine to automatically learn the second association.

41. The non-transitory computer-readable medium of claim 24, further comprising:
(F) receiving third textual input from the first human;
(G) receiving fourth textual input from the first human; and
(H) determining, based on at least one of the first association and the second association, that the third textual input and the fourth textual input indicate that a second object $O_2$ has feature $F_0$.

42. The non-transitory computer-readable medium of claim 24, wherein (H) comprises determining, based on the first association and the second association, that the third textual input and the fourth textual input indicate that a second object $O_2$ has feature $F_0$.

43. The non-transitory computer-readable medium of claim 24, wherein the first association data and the second association data are the same data.

44. The method of claim 21, wherein the first sensor comprises a first imaging sensor, and wherein the first sensor data represents an optical input from the object $O_1$.

* * * * *